(12) United States Patent
Fei et al.

(10) Patent No.: US 11,867,454 B2
(45) Date of Patent: Jan. 9, 2024

(54) REFRIGERATOR HAVING SLIDE RAIL WIRING MECHANISM

(71) Applicants: QINGDAO HAIER REFRIGERATOR CO., LTD., Qingdao (CN); HAIER SMART HOME CO., LTD., Qingdao (CN)

(72) Inventors: Bin Fei, Qingdao (CN); Yihao Xu, Qingdao (CN); Xueli Cheng, Qingdao (CN); Yazhou Shang, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 138 days.

(21) Appl. No.: 17/614,551

(22) PCT Filed: Jan. 15, 2020

(86) PCT No.: PCT/CN2020/072194
§ 371 (c)(1),
(2) Date: Nov. 28, 2021

(87) PCT Pub. No.: WO2020/238259
PCT Pub. Date: Dec. 3, 2020

(65) Prior Publication Data
US 2022/0228796 A1    Jul. 21, 2022

(30) Foreign Application Priority Data
May 29, 2019    (CN) .......................... 201910455691.7

(51) Int. Cl.
*F25D 25/02*    (2006.01)
*H02G 11/00*    (2006.01)
*F25D 23/02*    (2006.01)

(52) U.S. Cl.
CPC .......... *F25D 25/025* (2013.01); *F25D 23/021* (2013.01); *A47B 2210/175* (2013.01); *F25D 2400/40* (2013.01); *H02G 11/006* (2013.01)

(58) Field of Classification Search
CPC .. F25D 25/025; F25D 23/021; F25D 2400/40; A47B 2210/175
See application file for complete search history.

(56) References Cited

U.S. PATENT DOCUMENTS 10,674,822 B1 * 6/2020 Koyama .............. A47B 88/467
2006/0097611 A1   5/2006 Kim et al.
(Continued)

FOREIGN PATENT DOCUMENTS

CN    101949628 A    1/2011
CN    102901308 A    1/2013
(Continued)

*Primary Examiner* — Kimberley S Wright
(74) *Attorney, Agent, or Firm* — Cheng-Ju Chiang

(57) ABSTRACT

A refrigerator with a slide rail wiring mechanism, comprising a compartment configured to open forward, and a drawer-type door, wherein the compartment comprises a bottom wall, a rear wall and two side walls, and the drawer-type door is provided with an electrical component; the slide rail wiring mechanism comprises a cable for supplying power to the electrical component and a first wiring box fixed in the compartment; the first wiring box is formed with a first receiving portion and a second receiving portion; the cable comprises a fixed section fixed in the first receiving portion and a movable section that may be at least partially received in the second receiving portion; the second receiving portion is disposed apart from the bottom wall, the second receiving portion comprises a top plate and a bottom plate, and the bottom plate is provided with drainage holes.

13 Claims, 7 Drawing Sheets

(56) References Cited

U.S. PATENT DOCUMENTS

| | | | | |
|---|---|---|---|---|
| 2011/0050065 A1* | 3/2011 | Lee | ............ | F25D 23/028 |
| | | | | 312/405.1 |
| 2011/0181163 A1* | 7/2011 | Han | ............ | F25D 23/065 |
| | | | | 312/405 |
| 2012/0262044 A1* | 10/2012 | Vulava | ............ | F25D 25/025 |
| | | | | 312/334.8 |
| 2015/0022072 A1* | 1/2015 | Haltmeyer | ............ | F25D 25/025 |
| | | | | 29/869 |
| 2020/0340738 A1* | 10/2020 | Bai | ............ | F25D 23/021 |
| 2021/0003337 A1* | 1/2021 | Voltarelli | ............ | F25D 11/022 |
| 2021/0010747 A1* | 1/2021 | Choi | ............ | F25D 25/025 |
| 2021/0018260 A1* | 1/2021 | Xu | ............ | F25D 23/028 |
| 2021/0190415 A1* | 6/2021 | Yang | ............ | F25D 25/025 |

FOREIGN PATENT DOCUMENTS

| | | | |
|---|---|---|---|
| CN | 105300021 A | 2/2016 | |
| CN | 106440606 A | 2/2017 | |
| CN | 106871529 A | 6/2017 | |
| CN | 109028726 A | 12/2018 | |
| CN | 109780806 A | 5/2019 | |
| JP | 2013-540974 A | 11/2013 | |

* cited by examiner

REFRIGERATOR HAVING SLIDE RAIL WIRING MECHANISM

CROSS REFERENCE TO RELATED APPLICATIONS

The present application is a 35 U.S.C. § 371 National Phase conversion of International (PCT) Patent Application No. PCT/CN2020/072194, filed on Jan. 15, 2020, which is based on and claims priority to Chinese Patent Application No. 201910455691.7, filed on May 29, 2019, the disclosure of which is incorporated by reference herein. The PCT International Patent Application was filed and published in Chinese.

TECHNICAL FIELD

The present invention relates to the technical field of refrigeration devices and particularly to a refrigerator having a slide rail wiring mechanism.

BACKGROUND

As people's living standards improve in the society, conventional household electrical appliance products are updated constantly to meet demands of the consumer market. As far as refrigerators are concerned, it is a currently widely-used technical solution to dispose a display screen or another electrical component on the door to enhance the appearance of the refrigerator and increase corresponding function. Electrical power transmission is mostly achieved on a conventional pivotable door bodies by disposing a corresponding cable in a hinge shaft; it is necessary to provide a cable that is movable as a drawer-type door is pushed or drawn, to achieve electrical connection between the drawer-type door and the cabinet side. Since the gap between the corresponding drawer box and the inner wall of the cabinet is small, the cable is prone to entanglement with other parts and damages, and even break and failure.

Regarding the above problem, a refrigerator having a slide rail wiring mechanism is already disclosed in the industry, wherein the constraint of the cable is achieved by using a wiring box to receive part of the cable in cooperation with other limiting structure designs. However, it is difficult for the slide rail wiring mechanism to form effective limitation and constraint of the movable part of the cable, and said movable part of the cable is still likely to interfere with the slide rail or other parts so that it is prone to squeeze and wear; additionally, as far as the low-temperature storage compartment of the refrigerator is concerned, corresponding condensate might accumulate on the inner wall and the wiring box of the compartment so that the cable gets frozen, which affects smooth opening of the drawer-type door and even causes disengagement and damages of the cable. Therefore, it is necessary to perform structural optimization design on the basis of the prior art to develop a new refrigerator having a slide rail wiring mechanism.

SUMMARY

An object of the present invention is to provide a refrigerator having a slide rail wiring mechanism, which can effectively avoid water accumulation, prevent the cable from freezing, and ensure the firm connection of the cable and the smooth opening of the drawer-type door.

To achieve the above object, the present invention provides a refrigerator having a slide rail wiring mechanism, comprising a compartment configured to open forward, and a drawer-type door configured to move back and forth to close or open the compartment, wherein the compartment comprises a bottom wall, a rear wall and two side walls disposed on left and right sides and opposed to each other, and the drawer-type door is provided with an electrical component; the slide rail wiring mechanism comprises a cable for supplying power to the electrical component and a first wiring box fixed in the compartment; the first wiring box is formed with a first receiving portion and a second receiving portion; the cable comprises a fixed section fixed in the first receiving portion and a movable section that may be at least partially received in the second receiving portion, and at least part of the movable section may retract in the second receiving portion or extend out of the second receiving portion when the drawer-type door moves; the second receiving portion is disposed apart from the bottom wall, the second receiving portion comprises a top plate and a bottom plate arranged opposite to each other in an up-down direction, and the bottom plate is provided with drainage holes.

As a further improvement of the present invention, the drainage holes are set to at least two drainage holes distributed at an interval in a front-rear direction.

As a further improvement of the present invention, the top plate extends obliquely and downwardly in a left-right direction from a side on which the second receiving portion opens.

As a further improvement of the present invention, a first fixing portion and a second fixing portion are provided at front and rear ends of the first wiring box, respectively, and the first receiving portion and the second receiving portion are disposed apart from each other in the left-right direction and are both located between the first fixing portion and second fixing portion; a side of the second receiving portion facing away from the first receiving portion is arranged open.

As a further improvement of the present invention, the first wiring box further comprises a third receiving portion connecting a front end of the first receiving portion with a front end of the second receiving portion, and a first clamping member for holding the cable is disposed at an end of the third receiving portion close to the second receiving portion.

As a further improvement of the present invention, the first wiring box further comprises a through hole passing through the first wiring box from top to bottom and provided between the first receiving portion and the second receiving portion.

As a further improvement of the present invention, the slide rail wiring mechanism comprises a support frame fixed on a rear side of the drawer-type door and a second wiring box fixed on the support frame.

As a further improvement of the present invention, the second wiring box is formed with a fixed receiving portion extending in a front-rear direction and a guide portion located behind the fixed receiving portion, and a second clamping member for holding the cable is disposed at the rear end of the fixed receiving portion; the guide portion is formed with a guide surface extending backward and in the left-right direction inwardly the compartment.

As a further improvement of the present invention, the slide rail wiring mechanism further comprises a base fixed on the bottom wall and used to mount the first wiring box, and the base is disposed adjacent to a front opening of the compartment.

As a further improvement of the present invention, the bottom wall protrudes upward to form a fixing boss, and the fixing boss is provided with a fixing hole for fixing the base.

As a further improvement of the present invention, the bottom wall further protrudes upward to form a raised rib located on an outer periphery of the fixing boss and adapted to the base, and the raised rib is provided with at least one notch.

As a further improvement of the present invention, the base is formed with a first mounting hole that is inclined backward and downward, and the first wiring box is provided with a second mounting hole at a position corresponding to the first mounting hole.

As a further improvement of the present invention, the bottom wall protrudes upwardly to form a supporting rib which extends obliquely upwards from front to back.

As a further improvement of the present invention, a partial area of the bottom wall is recessed downward to form a groove, and the first receiving portion and the second receiving portion are correspondingly disposed above the groove.

Advantageous effects of the present invention are as follows: in the refrigerator according to the present invention, at least part of the movable section may move along with the drawer-type door to retract in or extend out of the second receiving portion, and with the drainage holes being formed on the bottom plate forming the second receiving portion, the refrigerator effectively avoids the hidden safety hazard caused by the accumulation of water in the second receiving portion, prevents the cable from freezing, and ensures the firm connection of the cable and the smooth opening of the drawer-type door.

DETAILED DESCRIPTION

The present invention will be described in detail in conjunction with embodiments shown in the figures. However, the embodiments are not intended to limit the present invention. Structural, method or function variations made by those having ordinary skill in the art according to the embodiments are all comprised in the protection scope of the present invention.

Figure 1:
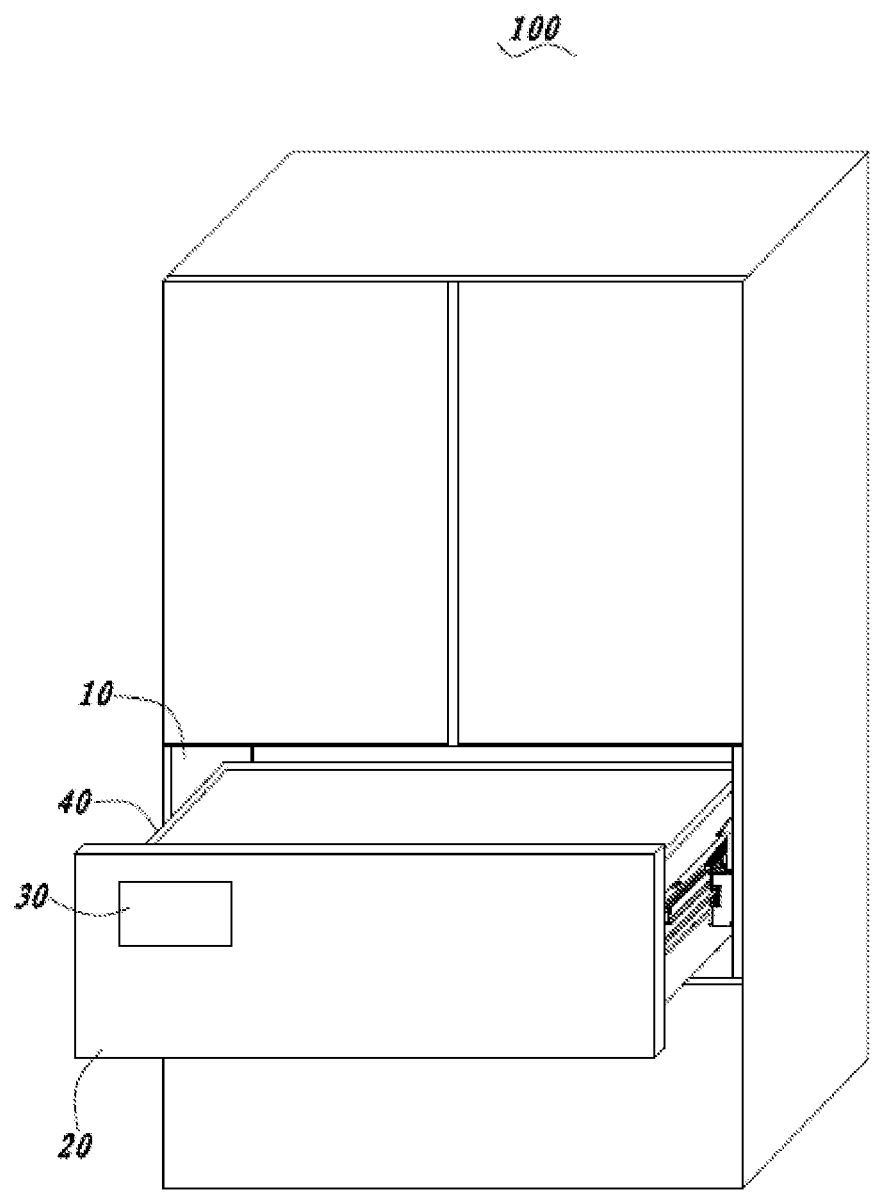
FIG. 1 is an overall schematic view of a refrigerator having a slide rail wiring mechanism according to the present invention.

Referring to FIG. 1, a refrigerator 100 according to the present invention comprises a compartment 10 configured to open forward, and a drawer-type door 20 configured to move back and forth to close or open the compartment 10. The drawer-type door 20 is provided with an electrical component that may be a touch screen 30; a drawer box 40 for storing articles is disposed in the rear of the drawer-type door 20.

Figure 2:
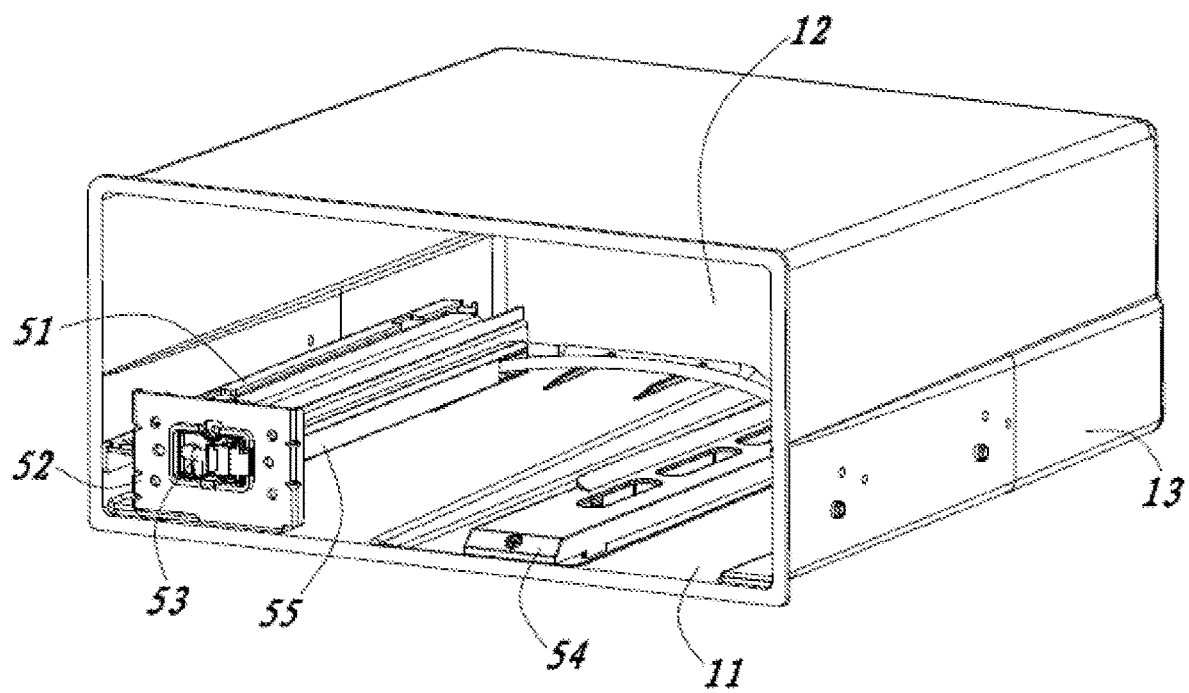
FIG. 2 is an assembly view of a liner and the slide rail wiring mechanism in the refrigerator according to the present invention.
Figure 3:
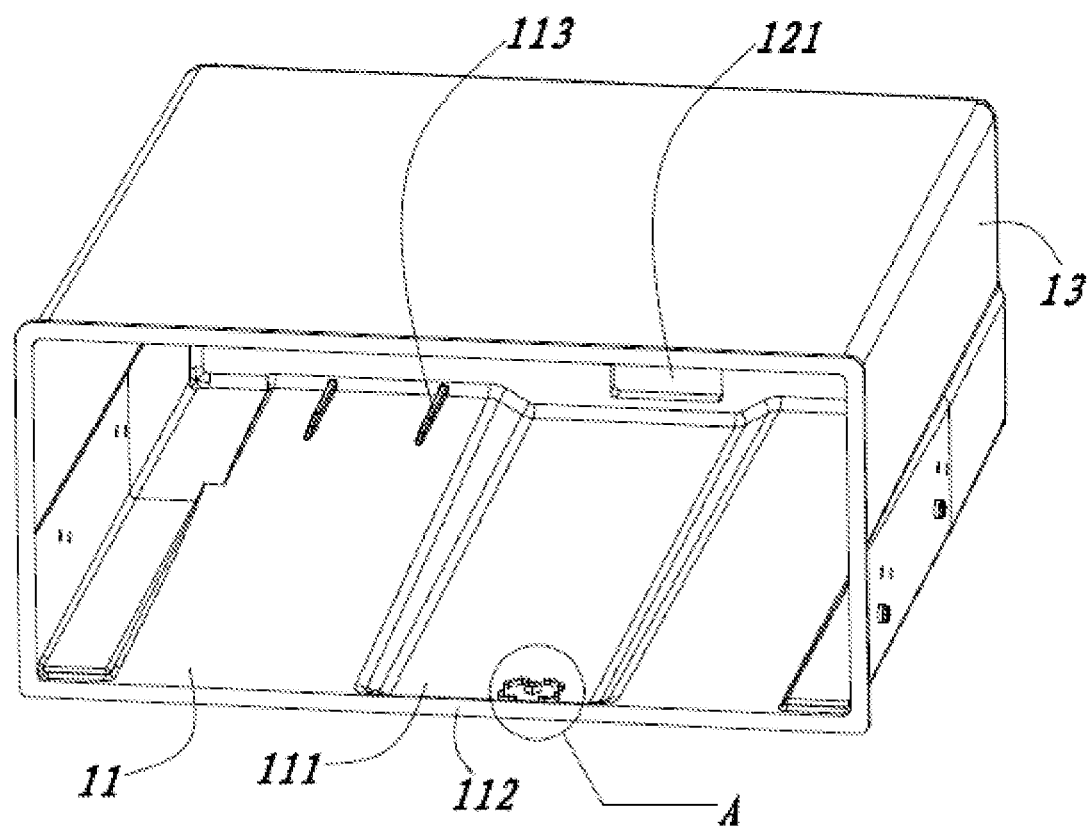
FIG. 3 is a schematic structural view of a liner in the refrigerator according to the present invention.
Figure 4:
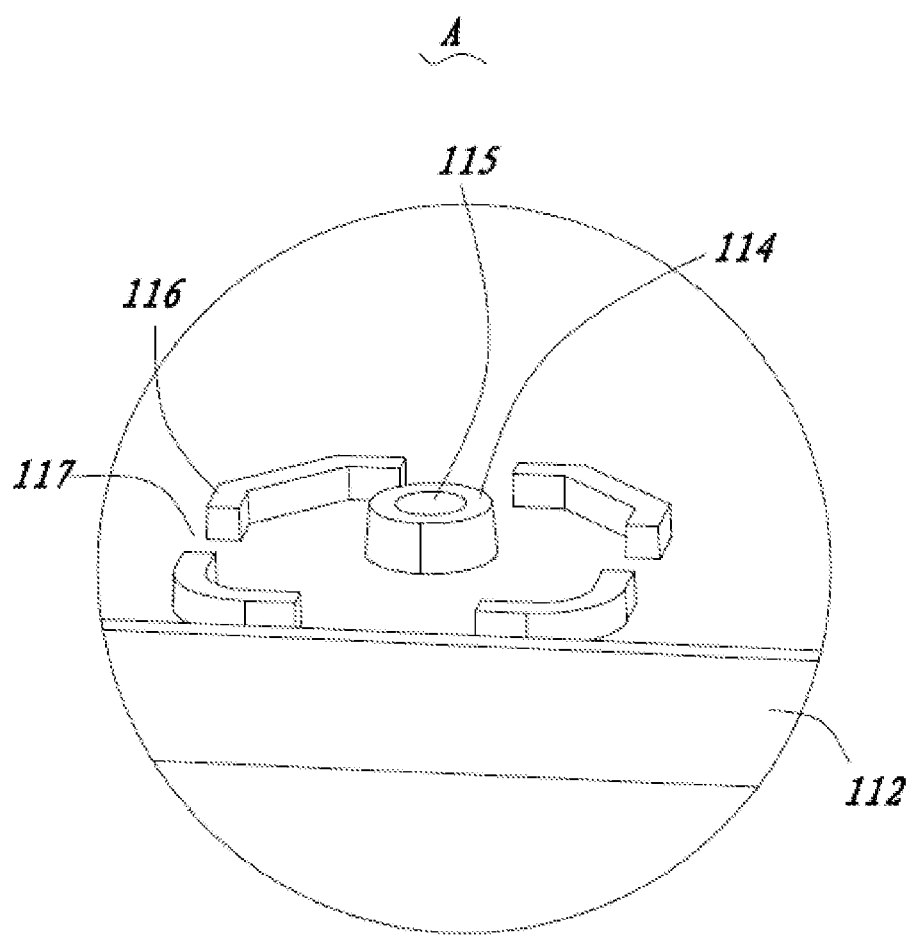
FIG. 4 is an enlarged view of area A of FIG. 3.
Figure 5:
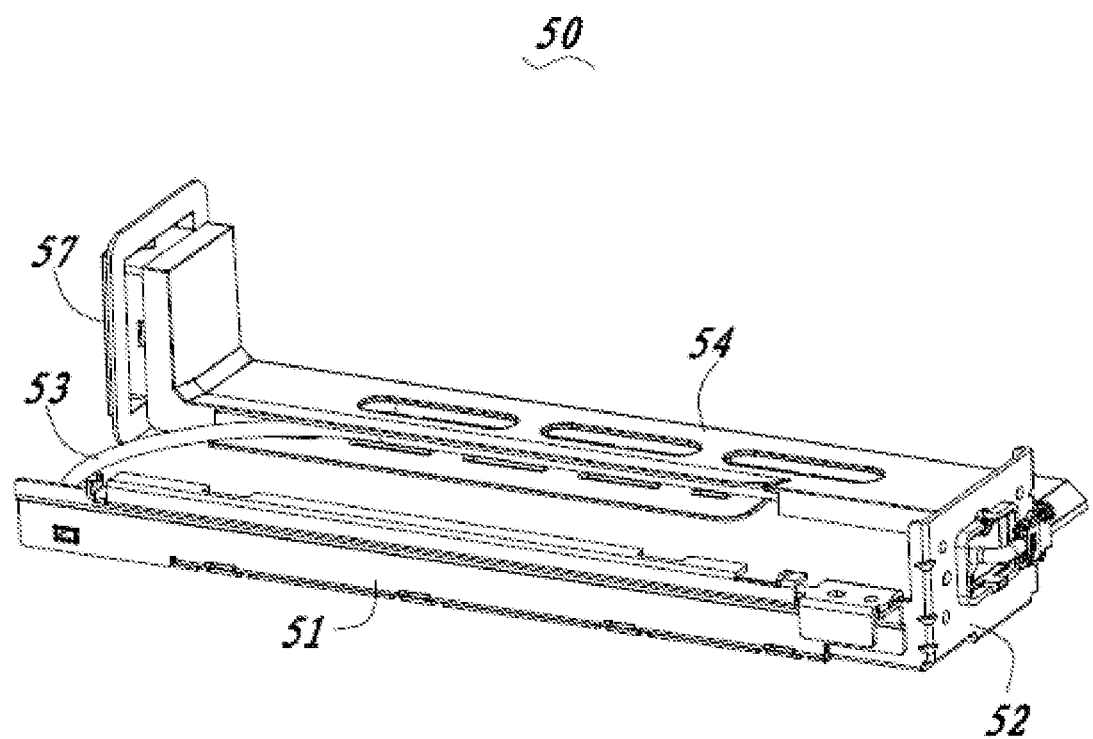
FIG. 5 is an assembly view of the slide rail wiring mechanism of the refrigerator according to the present invention.
Figure 6:
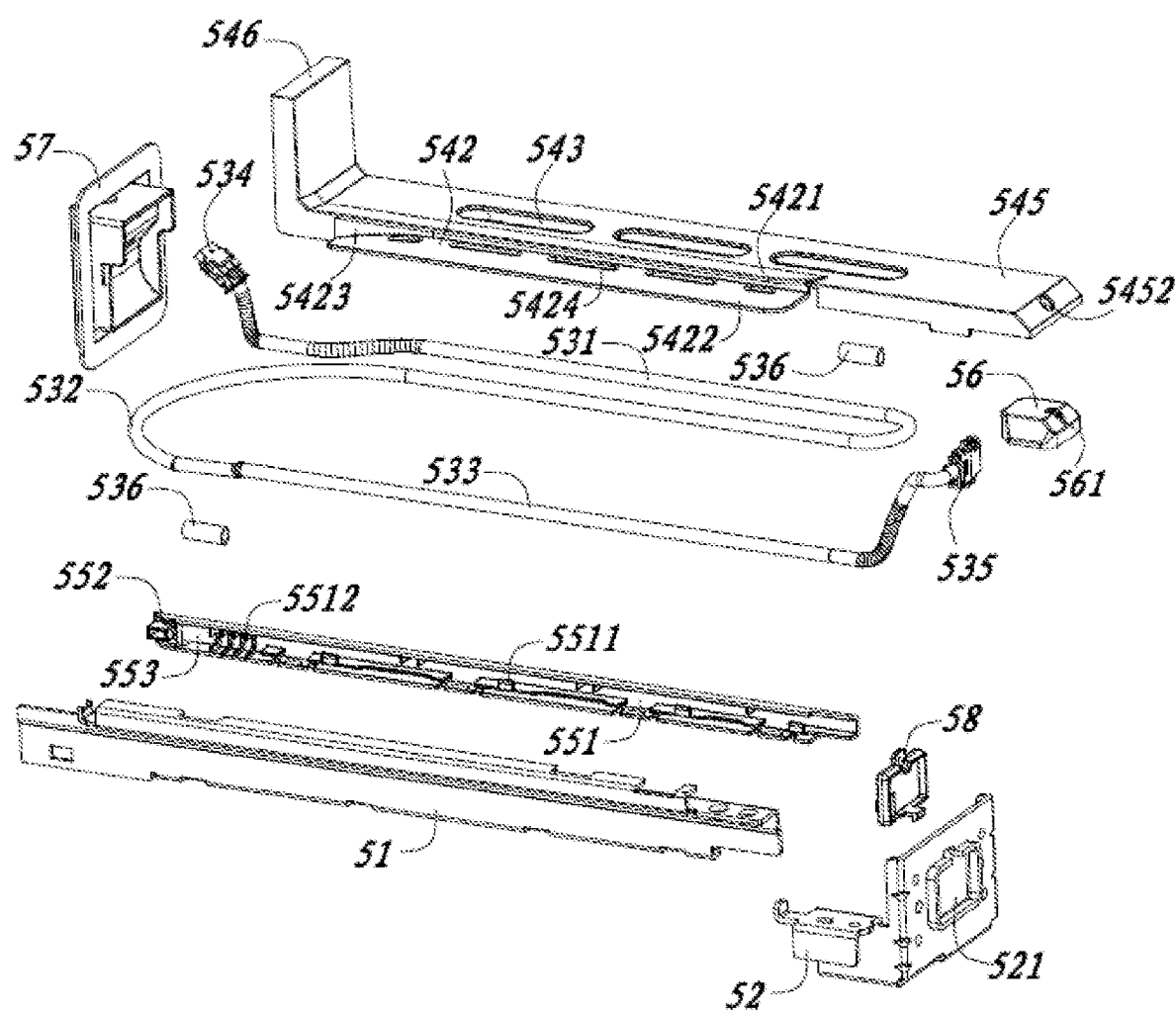
FIG. 6 is an exploded view of the slide rail wiring mechanism of the refrigerator according to the present invention.
Figure 7:
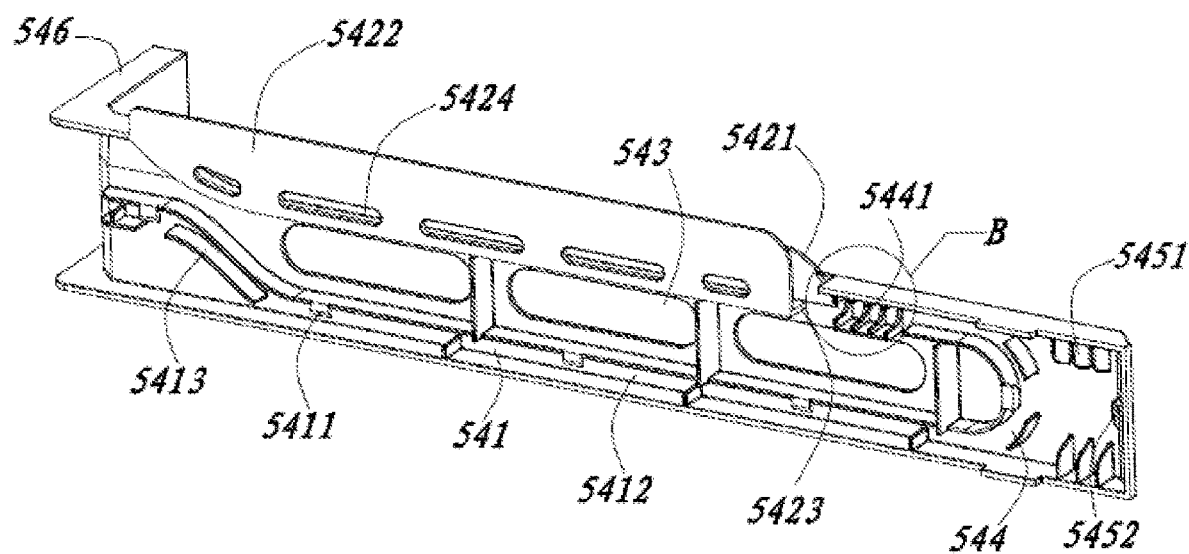
FIG. 7 is a schematic structural view of a first wiring box of the slide rail wiring mechanism of the refrigerator according to the present invention.
Figure 8:
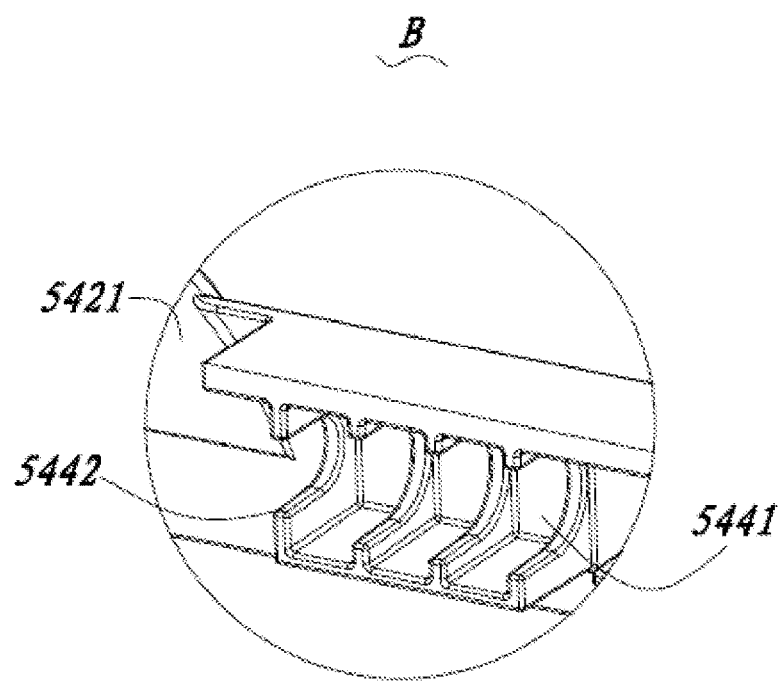
FIG. 8 is an enlarged view of area B of FIG. 7.

As shown in FIG. 2 and FIG. 3, the compartment 10 comprises a bottom wall 11, a rear wall 12 and two side walls 13 disposed on the left and right sides and opposed to each other. It may be appreciated here the compartment 10 is a liner configured to open forward and receive the drawer box 40.

As shown in FIG. 4 through FIG. 8, the refrigerator 100 further comprises a slide rail wiring mechanism 50. The slide rail wiring mechanism 50 comprises a support frame 51 fixed on a rear side of the drawer-type door 20 and configured to support the drawer box 40. The support frame 51 is disposed in the compartment 10 and slidable in a front-to-rear direction. Specifically, the support frame 51 can be mounted on the side wall 13 via a corresponding slide rail assembly (not shown). The sliding rail wiring mechanism 50 comprises a door supporting iron member 52 fixed on a rear side of the drawer-type door 20 and fixed to the support frame 51, and a connecting window 521 is provided on the door supporting iron member 52. In other embodiments of the present invention, the door supporting iron member 52 may be formed integrally with the support frame 51.

The slide rail wiring mechanism 50 further comprises a cable 53 for supplying power to the touch screen 30, a first wiring box 54 fixed in the compartment 10, and a second wiring box 55 fixed on the support frame 51. The first wiring box 54 is formed with a first receiving portion 541 and a second receiving portion 542 located below the drawer box 40; the second wiring box 55 is provided with a fixed receiving portion 551 extending in a front-rear direction and a guide portion 552 located behind the fixed receiving portion 551. The first wiring box 54 and the second wiring box 55 are disposed apart from each other, so that the cable 53 maintains a proper degree of bending between the second receiving portion 542 and the guide portion 552. In particular, the spacing between the second receiving portion 542 and the second wiring box 55 is set to be 15-20 times a diameter of the cable 53.

Both the first receiving portion 541 and the second receiving portion 542 are disposed apart from the bottom wall 11 to avoid possible erosion of the cable 53 caused by the condensate accumulating on the bottom wall 11, and to prevent the occurrence of abnormal conditions such as power leakage. In the present embodiment, a partial area of the bottom wall 11 is recessed downward to form a groove 111, and the first receiving portion 541 and the second receiving portion 542 are correspondingly disposed above the groove 111 and spaced apart from the bottom of the groove 111. The arrangement of the groove 111 reduces the occupation of the space between the bottom wall 11 and the drawer box 40 by the first wiring box 54, so that the spacing between the bottom wall 11 and the drawer box 40 may be reduced properly. Here, a front baffle 112 is also formed on the front side of the groove 111, and the height of the front baffle 112 coincides with the height of part of the bottom wall 11 on both sides of the groove 111. Furthermore, the groove 11 is disposed extending obliquely downward from front to rear, so that the moisture that might appear in the compartment 10 gathers to the rear of the groove 111.

The cable 53 comprises a fixed section 531 fixed in the first receiving portion 541, a movable section 532 that may be at least partially received in the second receiving portion 542 and extending toward the second wiring box 55, and the other fixed section 533 received in the fixed receiving portion 551. Both ends of the cable 53 are further provided with a first electrical connector 534 and a second electrical connector 535, respectively. Correspondingly, the compartment 10 and the drawer-type door 20 are respectively provided with electrical connectors (not shown) mating with the first electrical connector 534 and the second electrical connector 535. At least part of the outer circumference of the cable 53 is provided with a sheath to enhance the structural strength of the cable 53. The sheath may be made of a material such as a metal wire mesh or a resin, and the sheath is preferably disposed on the outer circumference of the movable section 532 of the cable 53.

The first receiving portion 541 and the second receiving portion 542 are disposed apart from each other in the left-right direction, and a side of the second receiving portion 542 facing away from the first receiving portion 541 is arranged open. A plurality of first limiting members 5411 are disposed in the first receiving portion 541, and the first limiting members 5411 are preferably provided as plate-shaped or hook-shaped protrusions integrally formed inside the first receiving portion 541 to limit the movement of the fixed section 531 in the height direction and the horizontal direction. The first receiving portion 541 is formed with a linear receiving space 5412, and a bent receiving space 5413 located rearward of the linear receiving space 5412, so that the rear end of the fixed section 531 is located exactly at a middle position of the first wiring box 54 in the left-right direction to facilitate the assembling and connection of the cable 53 with the compartment 10.

When the drawer-type door 20 is closed, at least part of the movable section 532 retracts inwardly into the second receiving portion 542; when the drawer-type door 20 is drawn out, at least part of the movable section 532 extends outward from the second receiving portion 542. When the humidity in the compartment 10 high, partial condensate still might accumulate in the second receiving portion 542. In particular, when the temperature in the compartment 10 is lower than the zero temperature, a freezing phenomenon might occur at part of the movable section 532 in the second receiving portion 542, which affects the smooth drawing out of the drawer-type door 20, and even causes the cable 53 to be damaged. In other words, it is necessary to, with effective technical means, further reduce the possible accumulation of water in the second receiving portion 542 to avoid freezing and adhesion of the movable section 532.

Here, the second receiving portion 542 comprises a top plate 5421 and a bottom plate 5422 arranged opposite to each other in the up-down direction, and a side plate 5423 connecting the top plate 5421 with the bottom plate 5422. The bottom plate 5422 is provided with drainage holes 5424. The drainage holes 5424 are set to at least two drainage holes distributed at an interval in a front-rear direction. Furthermore, the drainage holes 5424 are preferably disposed close to the side plate 5423. The water that might appear in the second receiving portion 542 may be smoothly discharged from the drainage holes 5424 into the groove 111 of the bottom wall 11, and then gathers along the bottom of the groove 11 to a given area. Here, the bottom plate 5422 and the bottom wall 11 are disposed apart, and the bottom plate 5422 is preferably not lower than the position of an opening of the groove 111 in the height direction, to reduce the wear of the cable 53. A side of the rear end of the side plate 5423 facing towards the second wiring box 55 is set in an arc shape, so that when the drawer box 40 retracts into the interior of the compartment 10, the bending tendency of the cable 53 is better limited.

The first wiring box 54 further comprises a through hole 543 passing through the first wiring box 54 from top to bottom and provided between the first receiving portion 541 and the second receiving portion 542, so that water dripping from the drawer box 40 to the top of the first wiring box 54 may be smoothly drained from the through hole 543 to the bottom wall 11. To further prevent the water on the top of the first wiring box 54 from entering the second receiving portion 542, the top plate 5421 extends obliquely and downwardly from a side on which the second receiving portion 542 opens, toward the side plate 5423.

The first wiring box 54 further comprises a third receiving portion 544 connecting a front end of the first receiving portion 541 with a front end of the second receiving portion 542. The third receiving portion 544 has a semicircular arc portion so that the cable 53 is bent 180° from the front end of the first receiving portion 541, and then enters the second receiving portion 542. A first clamping member 5441 for holding the cable 533 is disposed at the end of the third receiving portion 544 close to the second receiving portion 542 to prevent the cable 53 from play more effectively. A first fixing portion 545 and a second fixing portion 546 are formed at the front and rear ends of the first wiring box 54, respectively. The first receiving portion 541, the second receiving portion 542 and the third receiving portion 544 are all located between the first fixing portion 545 and the second fixing portion 546 in the front-rear direction.

The second wiring box 55 is held on the support frame 51, and the guide portion 552 is integrally formed with the fixed receiving portion 551. The fixed receiving portion 551 is provided with a plurality of second fixing members 5511 for restricting the movement of the cable 53. The second fixing members 5511 are also provided as plate-shaped or hook-shaped protrusions integrally formed in the fixed receiving portion 551. The guide portion 552 is formed with a guide surface extending backward and in the left-right direction inwardly the compartment, and the guide surface is preferably an arcuate surface. The second wiring box 55 further has a mounting opening 553 located between the fixed receiving portion 551 and the guide portion 552, and a second clamping member 5512 for holding the cable 53 is disposed at the rear end of the fixed receiving portion 551, i.e., at a portion close to the mounting opening 553. The cable 53 also comprises a clamping sleeve 536 adapted for the first clamping member 5441 and the second clamping member 5511 to keep the cable 53 from damages. The clamping sleeve 536 may also be integrally formed with a sheath of the cable 53. Especially, a blocking plate 5442 is disposed on the rear side of the first clamping member 5441, a size of the opening of the blocking plate 5442 is smaller than a diameter of the clamping sleeve 536, and the rear end of the clamping sleeve 536 may resist the blocking plate 5442 so that the movable section 532, even though getting frozen, does not affect the stability of other portions of the cable 53. Similarly, the second clamping member 5511 also employs the above design, which will not be repeated here.

The fixed receiving portion 551 is located below the drawer box 40 in the height direction, and the fixed receiving portion 551 is slightly higher than the second receiving portion 542 to prevent the movable section 532 of the cable 53 from damages due to friction with the bottom wall 11. Furthermore, the bottom wall 11 here protrudes upwardly to form a supporting rib 113. The supporting rib 113 extends obliquely upwards from front to back, and a rear end of the supporting rib 113 is disposed adjacent to the rear wall 12. When the drawer-type door 20 is closed, the movable section 532 moves above the supporting rib 113 to prevent the movable section 532 from blocking the water flow on the surface of the bottom wall 11 to make the use of the cable 53 safer, and also avoid the possible risk that the cable 53 gets frozen together with the bottom wall 11.

The slide rail wiring mechanism 50 further comprises a base 56 fixed on the bottom wall 11, a connecting box 57 fixed on the rear wall 12, and a cover plate 58 adapted for the connecting window 521 of the door supporting iron member 52. The first fixing portion 545 is fixed to the base 56; the second fixing portion 546 is fixed to the connecting box 57, and the rear wall 12 is provided with a mounting window 121 for mounting the connecting box 57.

The base 56 is preferably disposed and mounted in the groove 111, and the base 56 is disposed adjacent to the front opening of the compartment 10. The first fixing portion 545 covers and presses the base 56. The first fixing portion 545 opens downward so that the base 56 is received inside the first fixing portion 545, and the first fixing portion 545 is formed with a plurality of fixing ribs 5451 that resist the surface of the base 56 from both left and right sides. The fixing ribs 5451 arranged opposite to one another on the left and right sides taper toward the center from bottom to top to facilitate the mounting of the first fixing portion 545. To achieve the convenient mounting of the first fixing portion 545, the base 56 is formed with a first mounting hole 561 that is inclined backward and downward, the first fixing portion 545 is formed with a second mounting hole 5452 at a position corresponding to the first mounting hole 561, and the fixing and assembling of the first fixing portion 545 and the base 56 may be achieved with a corresponding screw.

Here, the base 56 itself is also fixed on the bottom wall 11 by a screw. The bottom wall 11 protrudes upward to form a fixing boss 114, and the fixing boss 114 is provided with a fixing hole 115 for fixing the base 56. The above design effectively prevents the water on the bottom wall 11 from leaking through the fixing hole 15 into a foamed layer and affecting the thermal insulation performance. In addition, the bottom wall 11 further protrudes upward to form a raised rib 116 located on an outer periphery of the fixing boss 114 and adapted to the base 56, that is, the raised rib 116 corresponds to the size of the bottom opening of the base 56 to facilitate the positioning and mounting of the base 56. The raised rib 116 is disposed apart from the fixing boss 114. To prevent water from entering between the raised rib 116 and the fixing boss 114, the raised rib 116 is provided with at least one notch 117. In addition, the bottom of the groove 111 extends obliquely downward from the front to the back, which also helps to prevent water from leaking through the fixing hole 115.

To sum up, the refrigerator 100 according to the present invention achieves the electrical connection of the drawer-type door 20 through the sliding rail wiring mechanism 50, and with the drainage holes 5424 being formed on the bottom plate 5422 forming the second receiving portion 542, the refrigerator effectively avoids the hidden safety hazard caused by the accumulation of water in the second receiving portion 542, prevents the cable 53 from freezing, and ensures the firm connection of the cable 53 and the smooth opening of the drawer-type door 20.

It should be understood that although the description is described according to the embodiments, not every embodiment only includes one independent technical solution, that such a description manner is only for the sake of clarity, that those skilled in the art should take the description as an integral part, and that the technical solutions in the embodiments may be suitably combined to form other embodiments understandable by those skilled in the art.

The detailed descriptions set forth above are merely specific illustrations of feasible embodiments of the present invention, and are not intended to limit the scope of protection of the present invention. All equivalent embodiments or modifications that do not depart from the art spirit of the present invention should fall within the scope of protection of the present invention.

What is claimed is:

1. A refrigerator having a slide rail wiring mechanism, comprising a compartment configured to open forward, and a drawer-type door configured to move back and forth to close or open the compartment, the compartment comprising a bottom wall, a rear wall and two side walls disposed on left and right sides and opposed to each other, the drawer-type door being provided with an electrical component, wherein the slide rail wiring mechanism comprises a cable for supplying power to the electrical component and a first wiring box fixed in the compartment; the first wiring box is formed with a first receiving portion and a second receiving portion; the cable comprises a fixed section fixed in the first receiving portion and a movable section that may be at least partially received in the second receiving portion, and at least part of the movable section may retract in the second receiving portion or extend out of the second receiving portion when the drawer-type door moves; the second receiving portion is disposed apart from the bottom wall, the second receiving portion comprises a top plate and a bottom plate arranged opposite to each other in an up-down direction, and the bottom plate is provided with drainage holes;
   wherein the slide rail wiring mechanism further comprises a base fixed on the bottom wall and used to mount the first wiring box, and the base is disposed adjacent to a front opening of the compartment;
   wherein the base is formed with a first mounting hole that is inclined backward and downward, and the first wiring box is provided with a second mounting hole at a position corresponding to the first mounting hole.

2. The refrigerator according to claim 1, wherein the drainage holes are set to at least two drainage holes distributed at an interval in a front-rear direction.

3. The refrigerator according to claim 1, wherein the top plate extends obliquely and downwardly in a left-right direction from a side on which the second receiving portion opens.

4. The refrigerator according to claim 1, wherein a first fixing portion and a second fixing portion are provided at front and rear ends of the first wiring box, respectively, and the first receiving portion and the second receiving portion are disposed apart from each other in the left-right direction and are both located between the first fixing portion and second fixing portion; a side of the second receiving portion facing away from the first receiving portion is arranged open.

5. The refrigerator according to claim 4, wherein the first wiring box further comprises a third receiving portion connecting a front end of the first receiving portion with a front end of the second receiving portion, and a first clamping member for holding the cable is disposed at an end of the third receiving portion close to the second receiving portion.

6. The refrigerator according to claim 4, wherein the first wiring box further comprises a through hole passing through the first wiring box from top to bottom and provided between the first receiving portion and the second receiving portion.

7. The refrigerator according to claim 1, wherein the slide rail wiring mechanism comprises a support frame fixed on a rear side of the drawer-type door and a second wiring box fixed on the support frame.

8. The refrigerator according to claim 7, wherein the second wiring box is formed with a fixed receiving portion extending in a front-rear direction and a guide portion located behind the fixed receiving portion, and a second clamping member for holding the cable is disposed at a rear end of the fixed receiving portion; the guide portion is formed with a guide surface extending backward and in the left-right direction inwardly the compartment.

9. The refrigerator according to claim 1, wherein the bottom wall protrudes upward to form a fixing boss, and the fixing boss is provided with a fixing hole for fixing the base.

10. The refrigerator according to claim 9, wherein the bottom wall further protrudes upward to form a raised rib located on an outer periphery of the fixing boss and adapted to the base, and the raised rib is provided with at least one notch.

11. The refrigerator according to claim 1, wherein the bottom wall protrudes upwardly to form a supporting rib which extends obliquely upwards from front to back.

12. The refrigerator according to claim 1, wherein a partial area of the bottom wall is recessed downward to form a groove, and the first receiving portion and the second receiving portion are correspondingly disposed above the groove.

13. A refrigerator having a slide rail wiring mechanism, comprising a compartment configured to open forward, and a drawer-type door configured to move back and forth to close or open the compartment, the compartment comprising a bottom wall, a rear wall and two side walls disposed on left and right sides and opposed to each other, the drawer-type door being provided with an electrical component, wherein the slide rail wiring mechanism comprises a cable for supplying power to the electrical component and a first wiring box fixed in the compartment; the first wiring box is formed with a first receiving portion and a second receiving portion; the cable comprises a fixed section fixed in the first receiving portion and a movable section that may be at least partially received in the second receiving portion, and at least part of the movable section may retract in the second receiving portion or extend out of the second receiving portion when the drawer-type door moves; the second receiving portion is disposed apart from the bottom wall, the second receiving portion comprises a top plate and a bottom plate arranged opposite to each other in an up-down direction, and the bottom plate is provided with drainage holes;

wherein the slide rail wiring mechanism further comprises a base fixed on the bottom wall and used to mount the first wiring box, and the base is disposed adjacent to a front opening of the compartment;

wherein the bottom wall protrudes upward to form a fixing boss, and the fixing boss is provided with a fixing hole for fixing the base;

wherein the bottom wall further protrudes upward to form a raised rib located on an outer periphery of the fixing boss and adapted to the base, and the raised rib is provided with at least one notch.

* * * * *